(12) United States Patent
Kotzin (10) Patent No.: US 7,243,072 B2
(45) Date of Patent: Jul. 10, 2007

(54) PROVIDING ASSISTANCE TO A SUBSCRIBER DEVICE OVER A NETWORK

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 371 days.

(21) Appl. No.: 10/608,989

(22) Filed: Jun. 27, 2003

(65) Prior Publication Data

US 2004/0267535 A1    Dec. 30, 2004

(51) Int. Cl.
*G10L 15/00* (2006.01)
(52) U.S. Cl. ................................. 704/270.1
(58) Field of Classification Search ............... 704/270, 704/270.1, 275
See application file for complete search history.

(56) References Cited

U.S. PATENT DOCUMENTS

| 5,335,276 | A | * | 8/1994 | Thompson et al. | ......... | 380/266 |
| 5,583,560 | A | * | 12/1996 | Florin et al. | ................ | 704/275 |
| 5,651,056 | A | * | 7/1997 | Eting et al. | ................. | 704/270 |
| 5,652,789 | A | * | 7/1997 | Miner et al. | ........... | 379/201.01 |
| 5,659,597 | A | * | 8/1997 | Bareis et al. | ................ | 704/251 |
| 5,822,727 | A | * | 10/1998 | Garberg et al. | .......... | 704/270.1 |
| 6,185,535 | B1 | * | 2/2001 | Hedin et al. | ................. | 704/270 |
| 6,269,336 | B1 | * | 7/2001 | Ladd et al. | ................. | 704/270 |
| 6,466,654 | B1 | * | 10/2002 | Cooper et al. | ........... | 704/270.1 |

OTHER PUBLICATIONS

Newton, Harry, Newton's Telecom Dictionary, 1996, New York, NY, pp. 375, 376 and 742.*
New Release, http://www.bell-labs.com/news/1998/february/6/1.html, Lucent Unveils Bell Labs Predictive Algorithms for Call Centers, Feb. 4, 1998, Dallas, TX, pp. 1-2.*

* cited by examiner

*Primary Examiner*—David D. Knepper (57) ABSTRACT

A method (300, 400) of and server (200) for providing assistance with control of a subscriber device is described. The method comprises receiving an instruction message (303) via a network that corresponds to spoken instructions from the subscriber device; converting the spoken instructions to control commands (309); providing a control message corresponding to the control commands (313); and sending the control message to the subscriber device (315), thereby assisting with the control of the subscriber device.

30 Claims, 4 Drawing Sheets

PROVIDING ASSISTANCE TO A SUBSCRIBER DEVICE OVER A NETWORK

RELATED APPLICATIONS

The present application is related to co-pending applications Ser. No. 10/608,991 and 10/608,593, respectively, by Kotzin having a filing date of Jun. 27, 2003 and assigned to the same assignee. Ser. No. 10/608,991 is titled METHOD AND APPARATUS FOR PROVIDING SECURE ASSISTANCE TO A COMMUNICATIONS UNIT OVER A NETWORK. Ser. No. 10/608,593 is titled METHOD AND APPARATUS FOR CONTROLLING AN ELECTRONIC DEVICE.

FIELD OF THE INVENTION

This invention relates in general to electronic devices such as communications units, and more specifically to a method and apparatus for providing assistance to such units over a network.

BACKGROUND OF THE INVENTION

Electronic devices such as communications units or subscriber devices providing data and voice services for user operating in corresponding systems are known. Operating these devices or units by interacting with a keypad or keyboard and display can be challenging when the user is otherwise preoccupied. It is known to include voice recognition systems to assist with controlling these devices for some purposes, however voice recognition systems are often marginal, suffer in high ambient noise environments, and can be a burden if the recognition system needs to be trained.

Controlling electronic devices or communications units from applications, for example, has been contemplated but such control has been limited to APIs (application program interfaces) where the interface details are defined according to the API. It is known to download software including applications to communication units as well as to configure the units. With these approaches there is a security risk and thus only highly trusted sources can have access to the unit. Clearly a need exists for methods and apparatus for providing assistance to a communications unit and preferably this assistance would be widely available over for example a network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In overview, the present disclosure concerns methods and apparatus for controlling and providing assistance with controlling electronic devices such as communications units. This control or assistance may be provided from remote agents or indirectly from assistant agents through the remote agent where these agents are available via a network to communications units that for example, have some sort of service relationship with the remote agent. These wireless communications or communications units are often referred to as subscriber devices, such as cellular phones or two-way radios or messaging devices and the like. More particularly various inventive concepts and principles embodied in systems, servers, and methods therein for providing, initiating, or facilitating control or assistance of the communications unit are discussed and described. Note that the devices or units can be a variety of devices, such as a personal digital assistant, personal assignment pads, and personal computers equipped for wireless operation, a cellular handset or device, or equivalents thereof provided such units are arranged and constructed to interface with the servers and systems arranged and operating in accordance with the principles and concepts described and discussed.

The principles and concepts discussed and described may be particularly applicable to systems and servers or agents that are networked via the Internet or world wide web and arranged and constructed for packet data communications including voice over IP (VoIP) with communications units. These units provide or facilitate voice communications services or data or messaging services over wireless wide area networks (radio WANs), such as conventional two way systems and devices, various cellular phone systems including analog and digital cellular, CDMA (code division multiple access) and variants thereof, GSM, GPRS (General Packet Radio System), 2.5 G and 3G systems such as UMTS (Universal Mobile Telecommunication Service) systems, integrated digital enhanced networks and variants or evolutions thereof. Furthermore the wireless communications units or devices can have short range communications capability normally referred to as W-LAN capabilities, such as IEEE 802.11, Bluetooth, or Hiper-LAN and the like that preferably utilize CDMA, frequency hopping, OFDM, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below various inventive principles and combinations thereof are advantageously employed to receive a request for assistance with a voice message that is converted to control commands with the commands being used to effect assistance with control of the unit. Control of the device or unit may be implemented by sending the controlling entity for a unit a message corresponding to normal keypad data. In this manner a remote agent can advantageously be tasked with converting voiced commands to control commands, such as keypad data, to assist with those activities that may detract from other duties, such as driving a vehicle and control of a device or unit can be effected with minimal risk of misuse provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
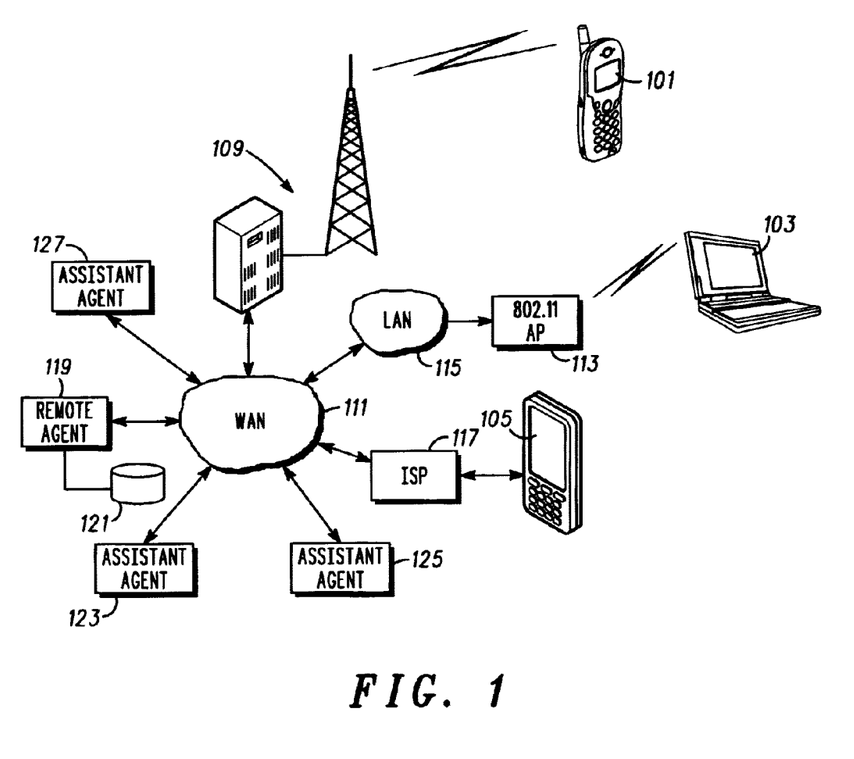
FIG. 1 depicts, in a simplified and representative form, a system that is suitable for providing assistance to communications units.

Referring to FIG. 1, a simplified and representative diagram of a system that is suitable for providing assistance to communications units and suitable for implementing methods of controlling and assisting the devices or units will be discussed and described. FIG. 1 shows wireless communications units 101, 103 and a wired communications unit 105. These units include a cellular handset 101 coupled via radio signals to a wide area radio access network 109 (radio WAN 109), such as a mobile phone or cellular system. Further included or depicted is a personal computer 103, such as a laptop or tablet computer that is shown coupled via radio signals to a W-LAN access network or access point 113 and further to LAN 115 (W-LAN 115). The W-LAN 115 is preferably based on IEEE 802.11 with corresponding access points but may also be a Bluetooth or other short range wireless LAN. Additionally a personal digital assistant 105 or the like is depicted as coupled, via for example a wired LAN or WAN, to an ISP 117 (Internet Service Provider).

The radio access network or radio WAN 109, LAN 115, and ISP 117 are coupled to a WAN, such as the Internet or World Wide Web or the like. In this manner each of the devices or communications units 101, 103, 105 are able to contact and be coupled to various servers, including an entity designated remote agent 119. The remote agent 119 is coupled to a memory 121, such as a magnetic disk drive. Further shown are a plurality of assistant agents 123, 125, 127 that can be selected to assist the remote agent with providing assistance to the communications units on an as needed basis. These wired networks and wireless networks can serve a multiplicity of devices or units. Generally the networks, including wireless networks or W-LAN, and radio WAN systems and the Internet are known to one of ordinary skill and will not be further described in any detail, apart from any necessities with respect to the preferred embodiments. The communications units 101, 103, 105 are also generally known other than the modifications and improvements disclosed herein.

The remote agent and assistant agents are known servers or work stations, such as those available from manufacturers, such as Hewlett Packard, Dell and the like and normally including an individual to facilitate some functionality. These servers will be running or executing software packages or instructions to provide the inventive functionality as described and discussed herein. Given the known functions and structure of such servers and networks and units they will not be described in detail other than as related to the inventive principles and concepts disclosed and discussed below.

Figure 2:
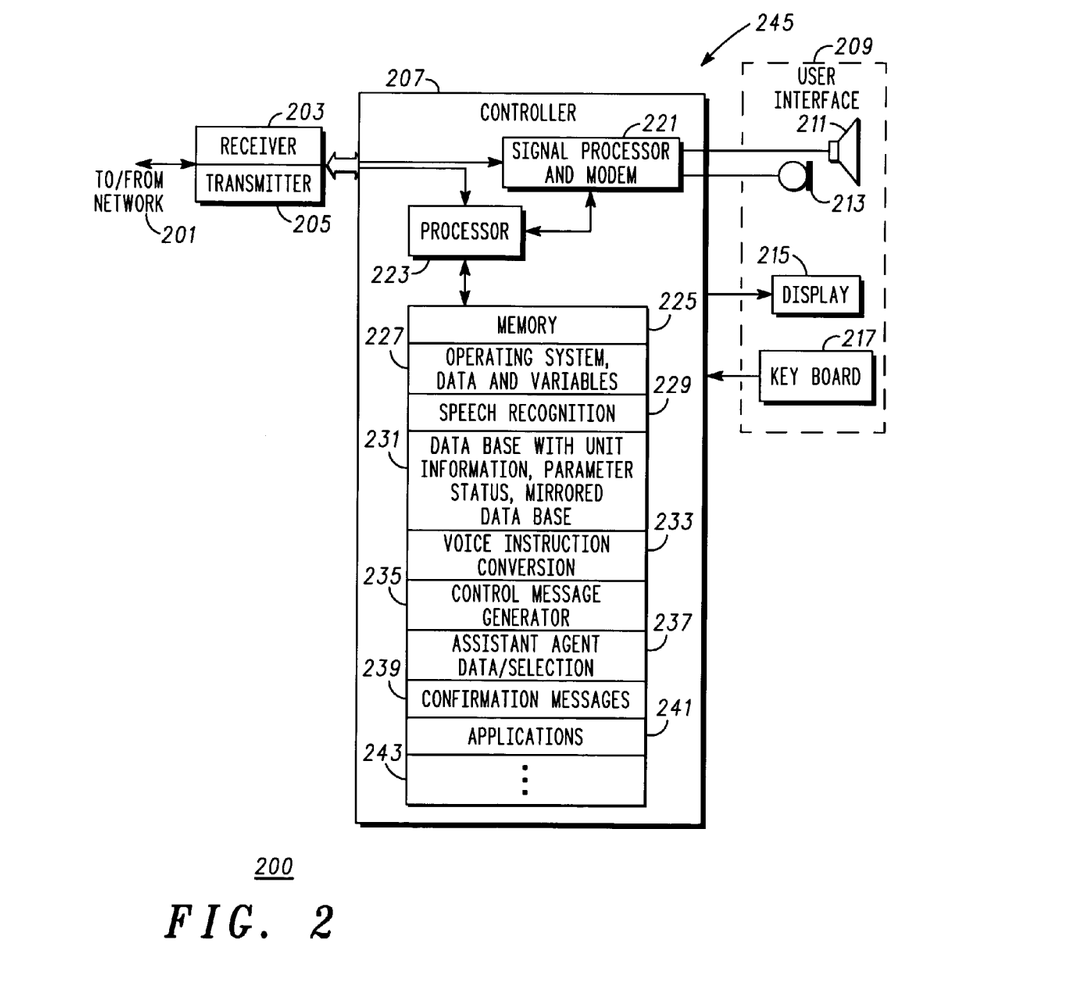
FIG. 2 depicts a block diagram of a preferred embodiment of a server that is arranged to assist with control of a communications unit.

Referring to FIG. 2 a block diagram of a preferred embodiment of a server 200, such as the remote agent 119 or assistant agents 123, 125, 127 (in part) will be discussed and described. The server is arranged, constructed, and operational to assist with control of a communications unit. Note that the specific functionality of portions, functional blocks or elements of the server can depend on the particular manufacturer and other conventions used by the network providers. These specifics of transmission and reception and relevant processing are known and therefore any further discussions will be in generalities that are applicable to typical servers and networks.

The server is coupled to and from a network 201 via a connection, such as an Ethernet based connection, using a normal wired connection such as an RJ 45 connector. Signals comprising packetized data from the network are coupled to and received by a receiver 203 or transmitted or sent from a transmitter 205 to the network as is known. The receiver 203 and transmitter 205 may be operational in a WAN network such as the Internet, in a typical wired network such as an Ethernet environment or the like. The receiver 203 provides a signal that is coupled to a controller 207 for further processing, such as call and audio or message processing. The transmitter 205 is also coupled to the controller 207 and the controller 207 operates to generate messages and so on, as known, to prepare signals for amplification and transmission by the transmitter 205.

The controller 207 is coupled to a user interface 209 that is typical for a computer or server based environment and that includes, for example, audio transducers, such as an earpiece or speaker 211 and microphone 213, display 215, keyboard 217, mouse (not specifically depicted) and the like. The transmitter 205, receiver 203, and user interface 209 are each inter-coupled, as depicted, to the controller 207 and the controller 207 provides overall operational command and control for the server. The controller 207 is coupled to and operates together with the audio transducers, display and keyboard or set of keys to effect a portion of a user interface experience that may depend on the particular device and its features and to facilitate generation and consumption of messages or other information. The elements and functionality of the user interface are known and widely available.

The controller 207 includes a signal processor/modem 221, typically digital signal processor based that is used for generating signals to be provided to the transmitter as well as processing signals from the receiver. The signal processor 221 functionally includes known and appropriate A/D and D/A convertors, an audio vocoder, channel coders and decoders, a modem, and other known functions. For example audio from the microphone 213 is processed through an A/D convertor and then the vocoder to provide audio frames. These frames may be combined or sequenced with other control information, data, and the like, channel coded, packetized (consistent with known VoIP schemes) and then used to modulate, via the modem, a signal that can be the carrier signal that is subsequently amplified by the transmitter. The signal processor also works essentially in reverse to demodulate signals from the receiver and provide messages or data for further processing by the controller, including for example applying voice packets or VoIP packets to a vocoder with an output coupled to a D/A convertor that is used to drive the earpiece or speaker 211. The controller further includes a processor 223 that is, preferably, a known microprocessor based element that is widely available and can include one or more microprocessors and one or more digital signal processors depending on the precise responsibilities of the controller 207 with respect to signaling duties and call processing that are not here relevant.

In any event the processor 223 is also coupled to a memory 225 that can be, for example, a combination of known RAM (Random Access Memory), ROM (Read-Only Memory), EEPROM (Electrically Erasable Programmable ROM) or magnetic memory that among other items, such as messages and folders with messages, address books, standard or canned messages, and various operating variables and parameters will store an operating system and software and various operating variables and parameters 227 for execution and use by the processor 223. This memory can include the memory 121 or portion thereof. This operating software when executed by the processor 223 will result in the processor 223 performing the requisite functions of the server such as interfacing with and controlling the transceiver or transmitter 205, receiver 203, signal processor/modem 221 and user interface 209 including display and keyboard, audio processing functions and so on including other functional elements not depicted and software routines that will be further described below.

The memory 225 further includes message processing routines not specifically shown for supporting packet based voice and data messages that will be appreciated by one of ordinary skill and that can vary depending on network specifics. As depicted, the memory 225 further includes space for a speech recognition program 229. Further included in the memory are databases 231 including communication unit specific information, unit parameter status and a mirrored database including for example, one or more of a phone book, address book and the like for each communications unit that the server provides assistance to, voice instruction conversion routines 233 (can be part of an application for providing assistance depending on software architecture), a control message generator 235 corresponding to the various features and functions of specific communications units, such as dialing or looking up a number, etc.

Also included and further discussed below are Assistant agent data/selection routines 237, confirmation messages routines 239, and applications 241, including for example a user interface to facilitate providing assistance to communications units as well as programs for maintaining or presenting statistics. The reader or one of ordinary skill will appreciate that this listing is merely a brief listing of exemplary routines that will be required or advantageous in effecting a server or agent for providing assistance to communications units and other services and various command and control duties and that many others 243 including user interface drivers, etc. that can be stored in the memory have not been mentioned.

The following discussion will focus on the operational interactions and refer to the FIG. 2 depiction of server 200 that can provide remote assistance in an advantageous manner. The server 200 can be the remote agent or assistant agent as described in the initial portions of this discussion. The server 200, as noted above, is arranged and constructed to assist with control of a communications unit and this capability may be used by communications units for taking advantage of remote assistance service when desired. The server 200 includes the receiver 203 to receive an instruction message that corresponds to voiced instructions from one of a multitude of communications units qualified to utilize the assistance service. In one embodiment this instruction message uses known VoIP (voice over Internet protocol) techniques and capabilities. In addition to the instruction message, the receiver further receives specific information sufficient to identify the communications unit, such as an address or URL, URI (uniform resource locator, identifier) or other identifying indicia that can be used as an index to appropriate portions of the database 231. From time to time the receiver will also receive messages with information to populate and maintain a database as is known and that corresponds to the communications unit. This database is stored in the memory that is part of the memory 121 also shown as 225 in FIG. 2. The database associated with the communications unit, includes one or more of unit specific information, a parameter status, such as ringer type, and a mirrored database associated with the communications unit. The mirrored database includes, for example, items that can stored in the communications unit that may change from time to time, such as phone books, address books, and the like.

Further included is the controller 207, coupled to the receiver and used in the assistant agent and one embodiment of the remote agent to, among other duties, convert the voiced instructions or a portion of the voiced instructions to control commands, such as keypad data that would result from key pad activations at the communications unit. In any event, the control commands are specific to the communications unit or correspond to a type of the unit and are used by the controller to formulate or generate and otherwise provide a control message corresponding to the control commands. The conversion process includes one or more of an automated conversion technique wherein the VoIP packets are applied to a vocoder to provide speech with the speech analyzed by the speech recognition routine 229, in total or in part, or manual techniques where the speech is used to drive the speaker or earpiece 211 for operator conversion.

For example, common instructions, such as call or dial and perhaps the particular digits or numbers may be recognized by the speech recognition software while other voiced commands require intervention and conversion by an operator or at least review and approval of the results of the speech recognition by the person, agent or operator. It is anticipated that an operator would be presented with a screen that is specific to the type of a communications unit along with the speech as decoded, rendered, or interpreted by the signal processor 221, specifically vocoder, and allowed to select from various menus to provide the proper control commands for the unit. Presenting this screen or screens to an operator and capturing operator key strokes or actions would be controlled or facilitated by an application 241, the voice instruction conversion routines 233 and control message generator 235 each or all with reference to the database 231 as it applies to the particular communications unit. The specifics of the interface screens and designs thereof can be optimized with operator experience, however they are within the wherewithal of one skilled in the art and will not be further discussed.

In addition, the transmitter 205 cooperatively operates with and is controlled by the controller to send the control message to the communications unit, preferably using known packet data techniques thereby assisting with the control of the communications unit. Note also that the transmitter can be used to send a confirmation message provided by the controller using the confirmation messages routines 239, as a confirmation that the receiver received the instruction message. In addition, a verbal message can be generated by the controller and forwarded by the transmitter where the message provides a user of the communications unit an indication of what control commands have or are concurrently being forwarded, thus what the communications unit is executing or will execute if approved by the user.

The server 200 using these principles and concepts can assist the communications unit by, for example, using the controller to convert or assist with conversion of the voiced instructions to the control commands, the control commands, when executed by the communications unit, will effect actions at the communications unit such as dialing a number, looking up a number in a phone book of the communications unit, the phone book incorporated into the mirrored database at the server associated with the communications unit, modifying contents of a memory of the communications unit, the modifying also performed on the mirrored database associated with the communications unit, sending a text message, or the like.

In another aspect or embodiment the server 200 operates at least in part as a distribution server to distribute a plurality or portion thereof of incoming instruction messages from corresponding communications units to assistant agents or servers. In this embodiment, the controller further controls the transmitter to forward a message corresponding to or in part to each of the instruction messages. The message is forwarded to one of the assistant servers or assistant agents. The message that is forwarded to the assistant server is converted by the assistant server and agent operating as above discussed to the control commands and the assistant server then returns or replies to the server or remote agent with a second message corresponding to the control commands. The control message is generated and forwarded to the appropriate communications units by the server.

It is anticipated that a plurality of assistant servers or agents will be available. These agents are typically public individuals working for example from their homes to make extra money. Thus the server 200 or remote agent has to select the appropriate assistants and see that they have proper tools and information and are appropriately motivated and compensated. In one embodiment the controller 207 of the server selects the assistant server for a particular task from a plurality of assistant servers prior to the forwarding the message relying on the assistant agent data. selection routines 237. The assistant server is selected based on factors, such as availability of the assistant server and a ranking of the assistant server among the plurality of assistant servers. The assistant server is provided access, according to known techniques, to the database or portion of the database, via for example, the memory 121 or disk drive for the communications unit corresponding to the message that is forwarded. Security concerns may limit this access to only a portion of for example a phone book for the communications units.

The server 200 can determine the availability and extent of availability of the assistant server using the controller based on a log on record stored in the memory. The controller preferably determines the ranking of the assistant server or agent relative to other assistant agents based on data maintained in the memory at 237 where the data corresponds to one or more of: an extent of availability of the assistant server with assistants that are logged on for more hours, perhaps up to some limit, given priority or a higher ranking than other assistants; a timeliness of services provided by the assistant server with assistant agents or servers with an average response time, possibly weighted to emphasize recent history, given a higher ranking that other assistants; an accuracy of the services provided by the assistant server with assistants providing higher quality services given higher rankings than other assistant agents with quality based on audit information, complaints, etc. again with more recent information given more consideration; and economic considerations related to the assistant server, such as amounts charged per unit time or per task performed. The precise algorithm for ranking can be determined on an experimental basis or based on experience as data is collected with the selection of the assistant agent or server based on a round robin or random approach until the data is collected and ranking algorithm finalized. The ranking or results of the ranking would be updated from time to time.

Additional advantageous practices can also be supported with the server acting as a distribution server and providing the conversion tasks to the selected assistant servers or agents. For example, the quality of services can be improved by having the controller select more than one assistant server from a plurality of assistant servers and then control the transmitter to forward the message corresponding to the same instruction message to the more than one assistant server. Each of the more than one assistant servers can then perform the converting the voiced instructions and the returning the respective second message to provide more than one respective second message. The controller can then compare the more than one respective second message to detect an error in one of the respective second messages. If a difference is detected the controller of the server would be faced with a decision, such as to have the assistants repeat the conversion tasks or other assistants repeat the task to see whether the difference earlier noted disappears, or select the results from the more trusted or more accurate one of the selected assistants and forward a control message based on these results. Assuming 3 or more assistant agents were selected the controller could essentially vote on the results and forward the control message based on control commands from different assistants that are in agreement.

These approaches can also be used to evaluate an unknown or new assistant server or agent. For example, selecting more than one assistant server where a trusted assistant server together with the unknown assistant server is selected and comparing the response time and respective second messages from each for differences, with the implication that the trusted assistant is correct, is one approach for evaluating the unknown assistant server.

In any event a user of the communications unit or device that employs the above described assistance services may find the current challenge of operating an automobile or walking a crowded street while dialing a 10 or more digit phone number reduced to activating a PTT or PTA button and providing voiced instructions, such as call 987 123 4567 or call Mom and receiving a friendly beep when the call is being dialed by the unit. In the "call Mom" example the remote agent would need access to the unit's phone book by way of queries and response messages or access to a mirrored and synchronized phone book. The mind numbing task of sending a message to Jim Jones using for example a phone's normally numeric keypad, such as "please delay our 3PM meeting for 10-15 minutes" is again reduced to activating a button, speaking the instructions and waiting for a happy beep when the communications unit is sending the text message via for example SMS (short message service). Storing a phone number for work with an associated name at a particular location in a phone book is again straightforward for the user.

A portion of the server is a system 245 for assisting with controlling the communications unit. The system 245 can be integral to the server as depicted or an add on or accessory system with appropriate coupling between an ordinary controller for a server and the system 245. The structure, functionality and operation of such a system 245 has been described above and thus need not be repeated here. As noted the system or server in one aspect is a more or less known server advantageously operating according to a software program for assisting with control of a communications unit. The software program when loaded and executing on a processor of a server results in the server performing a method corresponding to the above described processes and procedures or the method embodiment described below.

Figure 3:
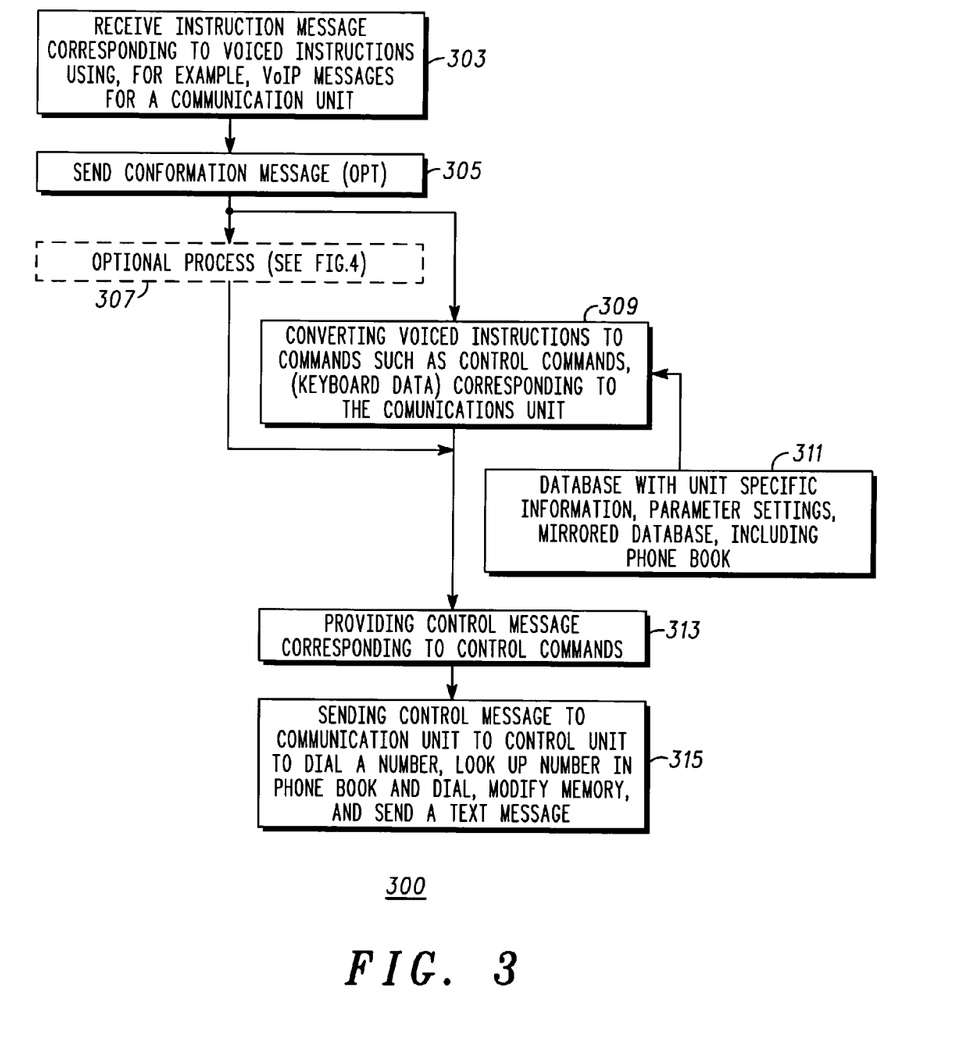
FIG. 3 depicts a flow chart of a preferred embodiment of a method of assisting with control of a communications unit.
Figure 4:
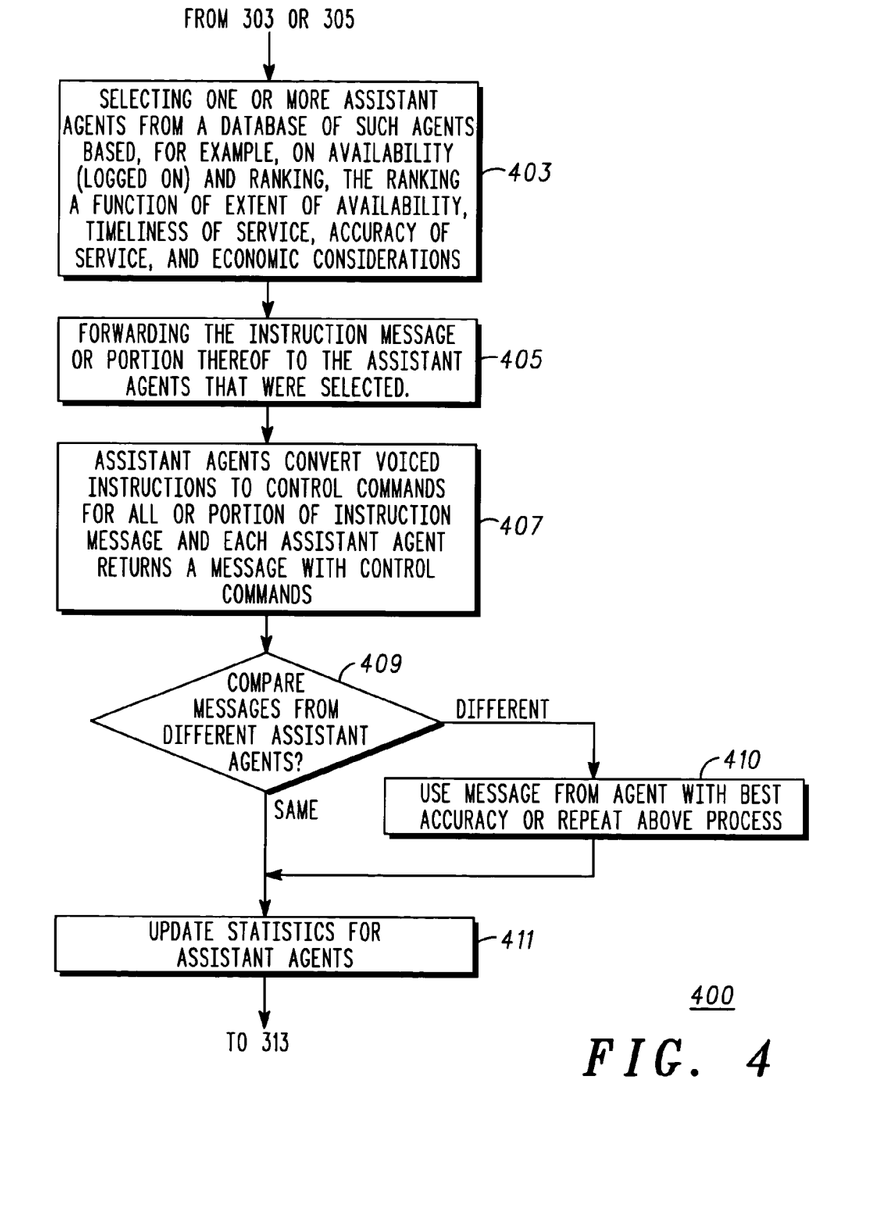
FIG. 4 shows a more detailed view of a portion of the FIG. 3 flow chart.

Referring to FIG. 3, a flow chart of a preferred method 300 of one embodiment of a method of providing assistance with control of an electronic device or communications unit from a remote agent will be reviewed and discussed. Some of this discussion will be in the nature of a review and summary of portions of the discussions above. The server 200 of FIG. 2 can advantageously perform the method 300 although various other structures would also be suitable for performing the method 300. The method 300 begins at 303 where receiving an instruction message that corresponds to voiced instructions from the communications unit using for example, VoIP messages is shown. This can include receiving specific information sufficient to identify the communications unit. At 305, an optional process of sending a confirmation message to the communications unit indicating receipt of the instruction message is depicted. Then at 307 an optional process that will be discussed below with reference to FIG. 4 is shown. If neither of the optional processes are used the method goes from 303 to 309. If 305 is present and 307 is not the process flows from 305 to 309. If 307 is present the method goes from 303 to 307 to 313 and thus skips 309.

Back to FIG. 3, after the procedure at 303 or 305, converting the voiced instructions to commands, such as control commands (keyboard data) corresponding to the communications unit is undertaken at 309. The process at 309 can rely on the database 311 or contents thereof that is maintained and includes one or more of unit specific information, such as type of unit, e.g. model number, manufacturer and version, parameter settings, such as ringer type etc, or a mirrored database, including for example a phone book, etc. Then, 313 depicts providing or generating a control message corresponding to the control commands where this message can include a verbalized message in VoIP format for the communications unit. Then 315 shows sending the control message to the communications unit, thereby assisting with the control of the communications unit. The control message will correspond to the original voiced instructions and correspond to or result in an action performed by the communications unit that includes for example dialing a number, looking up a number in a phone book of the communications unit, the phone book incorporated into the mirrored database associated with the communications unit, modifying contents of a memory of the communications unit, and sending a text message. This control message is preferably sent using packet data processes and connections.

Referring to FIG. 4, a flow chart showing the optional process at 307, will be discussed and described. Note that this process is a method used when the server is a distribution server and assistant servers are utilized. Some of the discussion below is a repeat of earlier material and will be presented in summary form. The server 200 of FIG. 2 can advantageously perform the method 400 although various other structures would also be suitable for performing the method. The method 400 is a method of using assistant agents and selecting and ranking those assistant agents or servers for assisting or controlling the communications unit. The method is an extension from the process at 303 or 305 and begins at 403 with selecting one or more assistant agents from a database including or identifying a plurality of assistant agents based on availability, given a log on status, of the assistant agent and a ranking of the assistant agent among the plurality of assistant agents. The ranking, as above noted, depends on one or more of an extent of availability of, a timeliness of services provided by, an accuracy of the services provided by, and economic considerations related to the assistant agent as compared to other agents.

Then, 405 indicates forwarding a message corresponding to the instruction message or a portion thereof to one or more assistant agents, preferably as selected at 403. This procedure occurs after the instruction message has been received at the remote agent. Next, 407 indicates that the assistant agent(s) performs the converting the voiced instructions to the control commands for all or the portion of the instruction message and each assistant agent returns to the remote agent, a second message corresponding to the control commands. The assistant agent may need access to the memory 121 or database 231 and can be granted such access as required (see 311) but no more thus securing the contents of this database from public individuals.

The process as 409 shows comparing the respective messages from 407 that were returned from the different assistant agents. This allows the detection of an error in the more than one respective second messages which is indicated by a difference in the messages. Of course, performing the process at 409 can be accomplished, provided that more than one assistant agent was selected from the plurality of assistant agents at 403 and the message with the voiced instructions was forwarded to each of the more than one assistant agent, thus resulting in each of the more than one assistant agent performing the converting the voiced instructions and the returning the respective second message thereby providing more than one respective second message from 407.

If a difference is detected, 410 indicates selecting the resulting message or commands corresponding to the assistant agent with the best accuracy or repeating the process above beginning at 403 or 405. This provides a way to improve the accuracy of the assistance offered by the method. It may also provide an approach for evaluating an unknown or new assistance agent. To do this the selecting more than one assistant agent would comprise selecting a trusted assistant agent and an unknown assistant agent and comparing the respective messages to evaluate the unknown assistant agent. In any event 411 shows updating statistics for the assistant agents that have participated. This can also comprise updating records regarding compensation for the assistant agents. After 411 the process returns to 313.

The apparatus, processes, and systems discussed above and the inventive principles thereof are intended to offer a novel and advantageous methodology for providing assistance to a user of an electronic device or communications unit. Using these principles of receiving voiced instructions, converting these instructions and sending corresponding control commands specific to a communications unit from a remote agent for execution by that unit will facilitate a cost effective, efficient, and friendly means for assisting a user with tasks that are otherwise burdensome and hence often avoided, thus contributing to user satisfaction.

Furthermore the concepts and principles disclosed and discussed for controlling a device or unit by developing and sending control commands, such as keypad data corresponding to keypad activations will provide a secure means of controlling the device or unit since a remote agent or application will not be able to do anything that a user of the device could not do with the keyboard. It is expected that one of ordinary skill given the above described principles, concepts and examples will be able to implement other alternative procedures that are communications device dependent and that will also offer additional quick and efficient procedures for controlling or assisting a device or unit. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for a remote agent to assist with control of a subscriber device, the method comprising:
    receiving from the subscriber device, an instruction message that corresponds to spoken instructions;
    converting the spoken instructions to control commands;
    providing a control message corresponding to the control commands; and
    sending the control message from the remote agent to the subscriber device, thereby assisting with the control of the subscriber device.

2. The method of claim 1:
    wherein the receiving the instruction message further includes receiving specific information sufficient to identify the subscriber device; and
    wherein the converting the spoken instructions includes converting the spoken instructions to the control commands that correspond to a type of subscriber device.

3. The method of claim 2 wherein the spoken instructions are converted to the control commands that correspond to keypad activations at the subscriber device.

4. The method of claim 2 further comprising maintaining a database associated with the subscriber device, the database including one of a parameter status and a mirrored database associated with the subscriber device.

5. The method of claim 4:
    wherein the spoken instructions corresponds to an action comprising one of;
        dialing a number,
        looking up a number in a phone book associated with the subscriber device, the phone book incorporated into the mirrored database associated with the subscriber device,
        modifying contents of a memory of the subscriber device, and
        sending a text message;
    wherein the control commands will effect the action when executed by the subscriber device.

6. The method of claim 1 further comprising sending a confirmation message as confirmation of the receiving the instruction message.

7. The method of claim 1 wherein the receiving the instruction message occurs at the remote agent and the method further comprises forwarding a first message corresponding to the instruction message to an assistant agent, the assistant agent performing the converting the spoken instructions to the control commands and returning to the remote agent a second message corresponding to the control commands.

8. The method of claim 7 further comprising selecting the assistant agent from a plurality of assistant agents prior to the forwarding the first message, the selecting based on availability of the assistant agent and a ranking of the assistant agent among the plurality of assistant agents.

9. The method of claim 8 wherein the availability of the assistant agent is determined by a log on procedure and the ranking of the assistant agent depends on one of an extent of availability of, a timeliness of services provided by, an accuracy of the services provided by, and economic considerations related to the assistant agent.

10. The method of claim 7 further comprising selecting more than one assistant agent from a plurality of assistant agents and forwarding the first message to the more than one assistant agent, each of the more than one assistant agent performing the converting the spoken instructions and the returning the respective second message to provide more than one respective second messages, the method further comprising comparing the more than one respective second messages to detect an error in the more than one respective second messages.

11. The method of claim 10 wherein the selecting more than one assistant agent further comprises selecting a trusted assistant agent and an unknown assistant agent and comparing the respective second messages to evaluate the unknown assistant agent.

12. A server arranged and constructed to assist with control of a subscriber device, the server comprising:
    a receiver to receive from the subscriber device an instruction message that corresponds to spoken instructions;
    a controller, coupled to the receiver to convert the spoken instructions to control commands and to provide a control message corresponding to the control commands; and
    a transmitter, coupled to the controller, to send the control message to the subscriber device, thereby assisting with the control of the subscriber device.

13. The server of claim 12:
    wherein the receiver further receives specific information sufficient to identify the subscriber device; and
    wherein the controller converts the spoken instructions to the control commands that correspond to a type of subscriber device.

14. The server of claim 13 wherein the controller converts the spoken instructions to the control commands that correspond to keypad activations at the subscriber device.

15. The server of claim 13 further comprising a memory for storing a database associated with the subscriber device, the database including one of unit specific information, a parameter status, and a mirrored database associated with the subscriber device.

16. The server of claim 15:
wherein the controller converts the spoken instructions to the control commands that, when executed by the communications unit, will effect an action comprising one of;
dialing a number,
looking up a number in a phone book of the subscriber device, the phone book incorporated into the mirrored database associated with the subscriber device,
modifying contents of a memory of the subscriber device, the modifying also performed on the mirrored database associated with the subscriber device, and
sending a text message.

17. The server of claim 12 wherein the controller controls the transmitter to further send a confirmation message as confirmation that the receiver received the instruction message.

18. The server of claim 12 wherein the controller further controls the transmitter to forward a first message corresponding to the instruction message to an assistant server, the assistant server performing the converting the spoken instructions to the control commands and returning to the server a second message corresponding to the control commands.

19. The server of claim 18 wherein the controller further selects the assistant server from a plurality of assistant servers prior to the forwarding the first message, the assistant server selected based on availability of the assistant server and a ranking of the assistant server among the plurality of assistant servers.

20. The server of claim 19 wherein the availability of the assistant server is determined by the controller based on a log on record stored in the memory and wherein the controller determines the ranking of the assistant server based on data maintained in the memory corresponding to one of an extent of availability of, a timeliness of services provided by, an accuracy of the services provided by, and economic considerations related to the assistant server.

21. The server of claim 18 wherein the controller selects more than one assistant server from a plurality of assistant servers and controls the transmitter to forward the first message to the more than one assistant server, each of the more than one assistant servers performing the converting the spoken instructions and the returning the respective second message to provide more than one respective second messages, the controller further comparing the more than one respective second messages to detect an error in the more than one respective second messages.

22. The server of claim 21 wherein the selecting more than one assistant server further comprises selecting a trusted assistant server and an unknown assistant server and comparing the respective second messages to evaluate the unknown assistant server.

23. A computer readable medium encoded with a software program for assisting with control of a subscriber device, the software program when loaded and executing on a processor of a server resulting in the server performing a method comprising:

receiving an instruction message from the subscriber device that corresponds to spoken instructions;
converting the spoken instructions to control commands;
providing a control message corresponding to the control commands; and
sending the control message from the server to the subscriber device, thereby assisting with the control of the subscriber device.

24. The computer readable medium encoded with a software program of claim 23:
wherein the receiving the instruction message further includes receiving specific information sufficient to identify the subscriber device; and
wherein the converting the spoken instructions includes converting the spoken instructions to the control commands that correspond to a type of subscriber device.

25. The computer readable medium encoded with a software program of claim 24, the method further comprising maintaining a database associated with the subscriber device, the database including one of a parameter status and a mirrored database associated with the subscriber device.

26. The computer readable medium encoded with a software program of claim 23 wherein the receiving the instruction message occurs at a distribution server and the method further comprises forwarding a first message corresponding to the instruction message to an assistant agent, the assistant agent performing the converting the spoken instructions to the control commands and returning to the distribution server a second message corresponding to the control commands.

27. The computer readable medium encoded with a software program of claim 26, the method further comprising selecting the assistant agent from a plurality of assistant agents prior to the forwarding the first message, the selecting based on availability of the assistant agent and a ranking of the assistant agent among the plurality of assistant agents.

28. The computer readable medium encoded with a software program of claim 27 wherein the availability of the assistant agent is determined by a log on procedure and the ranking of the assistant agent depends on one of an extent of availability of, a timeliness of services provided by, an accuracy of the services provided by, and economic considerations related to the assistant agent.

29. The computer readable medium encoded with a software program of claim 26, the method further comprising selecting more than one assistant agent from a plurality of assistant agents and forwarding the first message to the more than one assistant agent, each of the more than one assistant agent performing the converting the spoken instructions and the returning the respective second message to provide more than one respective second messages, the method farther comprising comparing the more than one respective second messages to detect an error in the more than one respective second messages.

30. The computer readable medium encoded with a software program of claim 29 wherein the selecting more than one assistant agent further comprises selecting a trusted assistant agent and an unknown assistant agent and comparing the respective second messages to evaluate the unknown assistant agent.

* * * * *